No. 788,811. PATENTED MAY 2, 1905.
W. E. ANDREÉ.
FRICTION CLUTCH FOR POWER TRANSMISSION.
APPLICATION FILED JUNE 4, 1904.
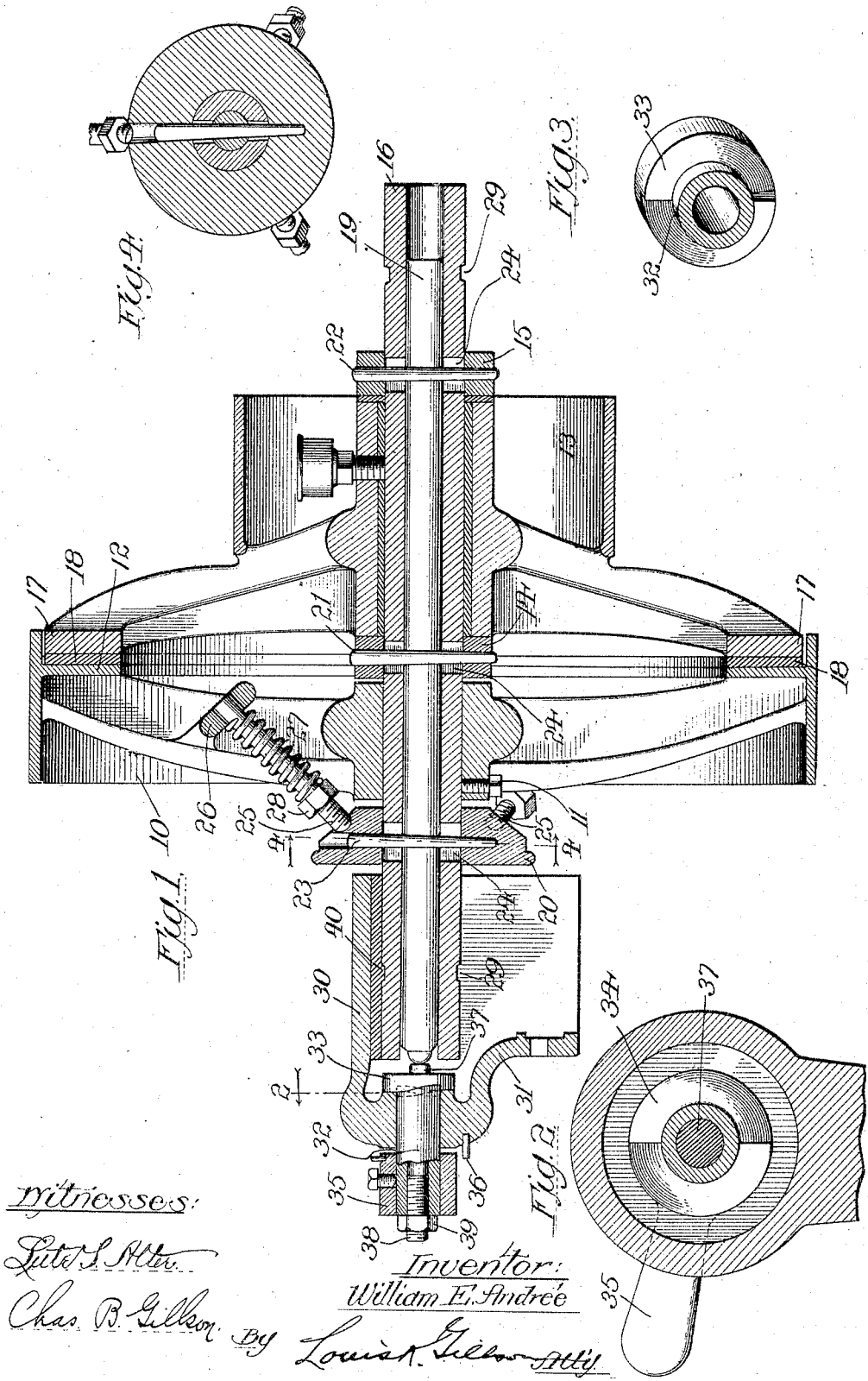

No. 788,811. Patented May 2, 1905.

UNITED STATES PATENT OFFICE.

WILLIAM E. ANDREÉ, OF CHICAGO, ILLINOIS, ASSIGNOR TO NELSON & KREUTER COMPANY, OF CHICAGO, ILLINOIS, A CORPORATION OF ILLINOIS.

FRICTION-CLUTCH FOR POWER TRANSMISSION.

SPECIFICATION forming part of Letters Patent No. 788,811, dated May 2, 1905.

Application filed June 4, 1904. Serial No. 211,208.

*To all whom it may concern:*

Be it known that I, WILLIAM E. ANDREÉ, a citizen of the United States, and a resident of Chicago, county of Cook, and State of Illinois, have invented certain new and useful Improvements in Friction-Clutches for Power Transmission, of which the following is a specification and which are illustrated in the accompanying drawings, forming a part thereof.

The invention relates to that class of clutches for power transmission in which a driving-pulley and a driven pulley are disposed side by side on an idle shaft and present lateral faces toward each other, which may be put in frictional contact by means of which the rotation of one pulley is imparted to the other.

The object of the invention is to supply a clutch of this type of simple and durable construction.

The invention consists in the construction which comprises a tight and loose pulley mounted on a hollow shaft, each presenting a friction-surface toward the other, provision being made for lateral displacement of the loose pulley and means for controlling this lateral displacement.

In the drawings, Figure 1 is a vertical longitudinal section of my improved clutch. Fig. 2 is a detail section on the line 2 2 of Fig. 1. Fig. 3 is a perspective of one of the parts, and Fig. 4 is a detail section on the line 4 4 of Fig. 1.

At 10 is shown the tight pulley. It is secured to the hollow shaft 16 by the set-screw 11, and its rim is provided with the inturned flange 12. The loose pulley 13 turns on the hollow shaft 16 between the collars 14 and 15. Attached to the spokes, which are illustrated as projecting beyond the rim, is a flange 17, designed to frictionally engage the inturned flange of the tight pulley 10. Its engaging surface is coated with a layer of paper 18 to increase the friction.

The collars 14 and 15 and also a collar 20 encircle the hollow shaft and are rigidly secured, by means of pins 21, 22, and 23, to a shipper-rod 19, inclosed within the hollow shaft. The latter is slotted longitudinally, as at 24, to accommodate a short range of movement of these pins.

A plurality of plungers 25, equally spaced about the axis of the shaft, bear against the collar 20, their outer ends being movably engaged by an aperture in the ears 26, projecting from the spokes of the tight pulley 10. A compression-spring 27, coiled about each plunger, reacts between the projecting ear 26 and a set-nut 28 on the plunger, its resultant effort being to force the collar 20 away from the hub of the tight pulley 10. The pressure on the collar 20 is communicated, through the shipper-rod 19 and the collar 15, to the hub of the loose pulley 13, pressing the friction-surface 17 of this pulley against that of the tight pulley 10.

The hollow shaft 16 is supported adjacent its ends on suitable hangers. (Not shown.) Grooves, as 29 29, cut in the shaft are intended to take up the babbitt of the bearing, whereby a shoulder 40 is formed to prevent lateral displacement of the shaft. The cap 30 to one of the bearings is provided with an overhang 31, which is drilled in a line continuous with the axis of the shaft to accommodate the sleeve 32, which is formed at its inner end into the disk cam 33. This cam engages a similar cam-surface 34, formed on the inner face of the overhang.

The movement of the disk cam 33 is obtained through the handle 35, secured to the outer end of the sleeve. A stop 36 is inserted in the overhang to limit the movement of the handle, and a pin 37 inserted in the sleeve projects inwardly from the cam-disk and bears against the end of the shaft 19, which is provided with a ball-bearing for reducing the friction. A set-screw 38 and lock-nut 39 provide for the adjustment of position of the pin 37.

The operation of the clutch is as follows: The expansion effort of the coiled springs 27 acting against the ears 26 on the pulley 10 and against the hub of the pulley 13 through the collar 20, the shipper-rod 19, and the collar 15 holds the friction-faces of the two pulleys normally in contact. The force with which they are pressed together may be varied by adjusting the set-nuts 28 on the plungers 25. In this position of the parts power supplied to one of the pulleys, as by means of a belt, will be communicated directly to the other pulley by the one imparting its rotation to the other. To separate the pulleys, the handle 35 is turned through one hundred and eighty degrees about the axis of the shaft. The cam-surfaces are so shaped that this rotation advances the disk, the sleeve-handle, and particularly the pin 37 inwardly, moving the shipper-rod 19, and with it the collars 20, 14, and 15, attached thereto. The loose pulley 13 being mounted between the collars 14 and 15 advances with them, moving longitudinally on the hollow shaft and out of contact with the tight pulley 10. The advance of the collar 20 compresses the spring 27, and the outer end of the plunger 25 moves freely through the aperture in the projecting ear 26. In this position of the parts either pulley may be rotated freely without rotation being imparted to the other.

Any tendency which the hollow shaft 16, and with it the tight pulley 10, may have to advance with the rod 19, the collars, and the loose pulley is resisted by the grooves 29 engaging the shoulders 40, formed in the babbitts. The incline of the cam-surfaces is so gradual as to prevent the return of the rod, due to the effort of the springs, until the cam shall have been rotated to its original position by means of the handle.

I claim as my invention—

1. In a clutch, in combination, a shaft; a reciprocating rod within the shaft; a pulley fixed to the shaft; a pulley loose on the shaft and attached to the rod so as to reciprocate therewith, the two pulleys having frictional engaging faces; a spring acting upon the two pulleys to force them together; and means for moving the rod relatively as to the shaft to separate the pulleys.

2. In a clutch, in combination, a shaft; a rod reciprocating within the shaft; a pulley rotating with the shaft; a pulley loose on the shaft but reciprocating with the rod, the two pulleys having frictional engaging faces; a collar encircling the shaft and fixed to the rod; a spring reacting between the first-named pulley and the collar to throw the pulleys together; and means for moving the rod in opposition to the spring.

3. In a clutch, in combination, a shaft; a rod reciprocating within the shaft; a pulley fixed to the shaft; a pulley loose on the shaft but engaged with the rod to move therewith, and being adapted to frictionally engage the other pulley; a collar loose on the shaft and fixed to the rod and located at the opposite side of the fixed pulley from the loose pulley; expansion-springs reacting between the collar and the fixed pulley; a fixed bracket having a disk-cam face; an oscillatable sleeve having a co-acting disk-cam face and bearing against the end of the rod to move it in opposition to the spring.

4. In a clutch, in combination, a shaft; two pulleys mounted on the shaft and having frictional engaging faces, one of such pulleys being fixed to rotate with the shaft and the other loose thereon, one of such pulleys movable longitudinally on the shaft and the other being fixed against such movement; a spring acting to force the pulleys together; a rod slidable longitudinally within the shaft and engaged with the longitudinally-movable pulley; and means for moving the rod to separate the pulleys.

5. In a clutch, in combination, a shaft; two pulleys mounted on the shaft and having frictional engaging faces, one of such pulleys being fixed to rotate with the shaft and the other loose thereon, one of such pulleys movable longitudinally on the shaft and the other being fixed against such movement; a spring acting to force the pulleys together; and a shipper-rod movable longitudinally within the shaft and engaging the longitudinally-movable pulley.

6. In a clutch, in combination, a shaft; two pulleys mounted on the shaft and having frictional engaging faces, one of such pulleys being fixed to rotate with the shaft and the other loose thereon, one of such pulleys movable longitudinally on the shaft and the other being fixed against such movement; a spring acting to force the pulleys together; a shipper-rod movable longitudinally within the shaft and engaging the longitudinally-movable pulley; a pair of coacting disk-faced cams one thereof being fixed against angular movement and the other oscillatable, and one thereof being movable laterally and the other fixed against lateral movement, the laterally-movable cam member bearing against the end of the rod to move it in opposition to the spring.

WILLIAM E. ANDREÉ.

Witnesses:
T. H. SIGOFOOS,
GEO T. RINGHOFF.